US006897937B2

(12) United States Patent
Choi

(10) Patent No.: US 6,897,937 B2
(45) Date of Patent: May 24, 2005

(54) FERROELECTRIC LIQUID CRYSTAL DISPLAY AND FABRICATING METHOD THEREOF

(75) Inventor: Su Seok Choi, Hanam-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/677,300

(22) Filed: Oct. 3, 2003

(65) Prior Publication Data

US 2004/0070703 A1 Apr. 15, 2004

Related U.S. Application Data

(62) Division of application No. 09/893,503, filed on Jun. 29, 2001, now Pat. No. 6,657,686.

(30) Foreign Application Priority Data

Dec. 30, 2000 (KR) ..................................... P2000-86963

(51) Int. Cl.$^7$ ................................................. G02F 1/13
(52) U.S. Cl. ......................................... 349/187; 349/88
(58) Field of Search .............................. 349/187, 86, 88

(56) References Cited

U.S. PATENT DOCUMENTS 5,504,600 A * 4/1996 Pirs et al. ..................... 349/89

* cited by examiner

*Primary Examiner*—James A. Dudek
(74) *Attorney, Agent, or Firm*—McKenna Long & Aldridge LLP

(57) ABSTRACT

A liquid crystal display cell, and a fabricating method thereof, that incorporates a light-cured monomer in a ferroelectric liquid crystal. By injecting the light-cured monomer/ferroelectric liquid crystal between substrate while in a nematic phase or isotropic phase, by performing DC voltage treatments as the liquid crystal temperature decreases, and by performing a light irradiation treatment, a stable, aligned ferroelectric liquid crystal cell is produced. Such a ferroelectric liquid crystal cell can reduce flicker and can be realigned after a physical shock.

7 Claims, 8 Drawing Sheets

ALIGNMENT DIRECTION OF ALIGNMENT FILM $E_1(-)$

SPONTANEOUS POLARIZATION DIRECTION OF LIQUID CRYSTAL $E_2(+)$

ALIGNMENT DIRECTION OF ALIGNMENT FILM

FERROELECTRIC LIQUID CRYSTAL DISPLAY AND FABRICATING METHOD THEREOF

This application is a divisional of prior application Ser. No. 09/893,503, filed Jun. 29, 2001 now U.S. Pat. No. 6,657,686.

CROSS REFERENCE

This application claims the benefit of Korean Patent Application No. P2000-86963, filed 30 Dec. 2000, under 35 U.S.C. §119, the entirety of which is hereby incorporated by reference.

BACKGROUND OF THE INVENTION

1. Field of the Invention

This invention relates to a liquid crystal display, and more particularly to a ferroelectric liquid crystal display having reduced flicker and a stable liquid crystal alignment.

2. Description of the Related Art

A liquid crystal display (LCD) controls the light characteristics of a display screen so as to produce a desired image. Liquid crystals used in liquid crystal displays are in a neutral state between a liquid and a solid. That neutral state has both fluidity and elasticity.

While there are many types of liquid crystals, one type of great interest is the smectic C liquid crystal. During a thermodynamic phase transition, smectic C liquid crystal molecules rotate along an outer line of a virtual cone. Such a smectic C phase liquid crystal can undergo a spontaneous polarization. Such a liquid crystal is usually referred to as a "ferroelectric liquid crystal" (FLC). The FLC has been actively studied because of its fast response time. Furthermore, FLC LCDs can have wide viewing angles without the complications of special electrode structures or compensating films.

There are many different FLC modes, including a deformed helix FLC, a surface stabilized FLC, an anti-FLC, a V-mode FLC and a half V-mode FLC. Hereinafter, the V-mode FLC mode and the half V-mode FLC mode will be described in more detail.

FIG. 1 shows a V-mode FLC liquid crystal cell. As shown, that liquid crystal cell includes an upper substrate 1 having a common electrode 3 and an alignment film 5. That liquid crystal cell also includes a lower substrate 11 having a TFT array 9, which includes pixel electrodes, and an alignment film 7. A V-mode liquid crystal 13 is interposed between the upper and lower substrates 1 and 11. The alignment films 5 and 7 are aligned in a horizontal direction, usually by rubbing the alignment layers with a special cloth roller. The V-mode liquid crystal 13 forms multiple smectic layers that have molecular structures arranged with desired slopes with respect to a plane perpendicular to the smectic layers. In other words, the liquid crystal molecules have desired inclination angles with respect to the horizontal alignment direction of the alignment films. Furthermore, adjacent smectic layers have opposite polarities.

Light transmission through a V-mode FLC liquid crystal cell varies according to an applied voltage across that cell, reference FIG. 2. The liquid crystal 13 within the V-mode FLC liquid crystal cell responds to both positive and negative voltages. Since the light transmissivity rapidly changes in accord with applied positive and negative voltages, the light transmissivity verses voltage curve has the V shape shown in FIG. 2. Thus, light transmissivity increases regardless of polarity.

FIG. 3 shows an alignment state of a half V-mode FLC liquid crystal cell. As shown, a half V-mode FLC liquid crystal 15 is interposed between an upper substrate 1 and a lower substrate 11. The half V-mode FLC liquid crystal 15 forms multiple smectic layers in which the liquid crystal molecules align at desired inclination angles with respect to a horizontal alignment direction of the alignment films 5 and 7. However, as shown in FIG. 3, the liquid crystal molecules in adjacent smectic layers have the same polarity (unlike V-mode FLC liquid crystal molecules). Such a half V-mode FLC liquid crystal can be formed by applying a positive (or a negative) electric field across a hot liquid crystal, and, at the same time, lowering that liquid crystal's temperature into a smectic phase.

A half V-mode FLC mode liquid crystal 15 formed in this manner responds to only one polarity of applied voltage. Thus, as shown in FIG. 4, a light transmissivity verse voltage curve of a half V-mode FLC liquid crystal cell has a 'half V' shape. Still referring to FIG. 4, as shown, the light transmissivity verses voltage curve does react, slightly, to negative applied voltages, but dramatically to positive applied voltages.

The light transmissivity curve shown in FIG. 4 represents a liquid crystal cell in which the liquid crystal molecules are aligned by a negative voltage. In this case, the light transmissivity of the liquid crystal cell almost does not increase when a negative voltage is applied, but rapidly increases when a positive voltage is applied. On the other hand, a liquid crystal aligned by a positive voltage increases its light transmissivity with an increase in a negative voltage.

The thermodynamic phase transition of a half V-mode FLC liquid crystal 15 is as follows:

Isotropic→nematic (N*) phase→smectic C* (Sm C*) phase→crystal

Such thermodynamic phase transitions express the phases of the liquid crystal in accordance with temperature, which becomes less as phase changes move to the right.

An isotropic phase liquid crystal 15 interposed into a liquid crystal cell aligns in parallel with the rubbing direction of an alignment layer when the liquid crystal temperature is slowly lowered to the nematic phase. If a sufficiently strong electric field is applied across the liquid crystal cell while the liquid crystal temperature is slowly lowered, the liquid crystal 15 is phase-changed into a smectic phase in which the direction of spontaneous polarization of the liquid crystal molecules is in accord with the electric field. Consequently, when the liquid crystal 15 within the liquid crystal cell is subjected to a parallel alignment treatment, the liquid crystal molecules arrange in a spontaneous polarization direction that is consistent with the electric field at the phase transition, and in one of two possible molecular arrangements. As a result, the liquid crystal 15 has a uniform alignment state.

FIG. 5 and FIG. 6 help illustrate this. First, as shown in FIG. 5, if a negative electric field E(−) is applied during alignment of the liquid crystal 15, then the spontaneous polarization direction of the liquid crystal 15 is along the electric field. In such an aligned liquid crystal cell, as shown in FIG. 6, the liquid crystal arrangement is changed by an applied positive electric field E(+), while a liquid crystal arrangement is not changed by an applied negative electric field E(−).

To utilize the response characteristics of the liquid crystal 15, perpendicular polarizers are arranged on the upper and lower portions of the liquid crystal cell. The transmission axis of one of the polarizers is along the direction of the initial liquid crystal alignment. Assuming a liquid crystal cell having the transmission curve of FIG. 4, an applied negative electric field E(−) does not change the liquid crystal arrangement and the perpendicular polarizer blocks light. A positive electric field E(+) rotates the liquid crystal alignment such that light transmission increases.

As described above, the half V-mode FLC liquid crystal cell uses both temperature and an applied electric field during alignment. However, such a liquid crystal cell has a problem in that breaking the initial alignment, such as by external impacts that are inevitably applied by grinding a shorting bar, destroys that alignment. To re-establish alignment, both temperature and electric fields must be used. However, this is difficult to do once the shorting bar, which was used for applying the electric fields, is removed. In addition to shock, heating a conventional half V-mode FLC liquid crystal cell can destroy the alignment.

Furthermore, the conventional half V-mode FLC liquid crystal cell has a 30 Hz flicker in which light is transmitted at 30 Hz with respect to an alternating current (AC) driving signal of 60 Hz, while light is not transmitted with respect to the remaining driving signal. Accordingly, it is necessary to address the flicker problem to image a stationary picture with an acceptable gray level.

One approach to flicker is to divide the pixel area into two sections having contrary electric charges. However, this scheme is complex to implement, particularly with high brightness.

An alternative scheme for addressing the flicker problem includes increasing the driving signal frequency. In other words, it may be possible to obtain a 60 Hz transmission characteristic (in comparison to the 30 Hz) by driving the display at 120 Hz (instead of at 60 Hz). However, this requires development of a novel driver IC, and thus increases cost.

Another approach to reducing flicker is to use the FLC liquid crystal cell shown in FIG. 7. Referring now to FIG. 7, that FLC liquid crystal cell has the uniform alignment characteristics of a half V-mode FLC liquid crystal cell. Also, the illustrated FLC liquid crystal cell has the symmetrical driving characteristics of the V-mode FLC liquid crystal cell, reference FIG. 8. The illustrated FLC liquid crystal cell has symmetrical driving characteristics because the liquid crystal is positioned at a central portion of a virtual cone area, which represents the rotatable positions, in accordance with temperament or rubbing of the alignment film. The illustrated liquid crystal cell enables the primary alignment direction of the liquid crystals to be consistent with the rubbing treatment of the alignment films.

However, the FLC liquid crystal cell illustrated in FIG. 7 is highly sensitive to the process condition of the alignment film. Since the FLC liquid crystal cell illustrated in FIG. 7 has a small alignment tolerance, the temperament conditions and the rubbing of the alignment film are critical. As a result, it becomes difficult to achieve equal alignment forces on the upper alignment film and on the lower alignment film. Furthermore, because of problems with achieving uniform alignment, the FLC liquid crystal cell illustrated in FIG. 7 has proven difficult to mass produce, particularly in large dimension LCDs.

SUMMARY OF THE INVENTION

Accordingly, it is an object of the present invention to provide a ferroelectric liquid crystal display, and a fabricating method thereof, with reduced flicker. It is another object of the present invention to provide a ferroelectric liquid crystal display with improved liquid crystal alignment stability.

To achieve these and other objects of the invention, a ferroelectric liquid crystal display according to one aspect of the present invention includes: an upper substrate and a lower substrate, each having an alignment film, and a ferroelectric liquid crystal interposed between the upper substrate and the lower substrate. That ferroelectric liquid crystal includes an additive for forming a stable polymer network. Beneficially, the ferroelectric liquid crystal display has alignment films on the upper and lower substrates to have parallel alignment treating directions. Even more beneficially, the additive is light sensitive.

A method of fabricating a ferroelectric liquid crystal display according to another aspect of the present invention includes providing an upper substrate and a lower substrate; forming alignment films on the upper and lower substrates; joining the upper substrate with the lower substrate; interposing a ferroelectric liquid crystal having a light-curing monomer between the upper and lower substrates; applying an initial DC voltage to uniformly align the liquid crystal; applying a DC voltage of the opposite polarity (to that of the initial DC voltage) to orientate the liquid crystal with the alignment films; and irradiating light onto the light-curing monomer to form a polymer network.

In the method, the temperature of the interposed liquid crystal is above the phase-change temperature of the smectic phase (being in an isotropic or nematic phase). The method further includes raising the temperature of the liquid crystal cell to change the liquid crystal into a nematic phase after curing the polymer; and lowering a temperature of the nematic phase liquid crystal to change the liquid crystal into a smectic phase.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE ILLUSTRATED EMBODIMENT

Figure 9A:
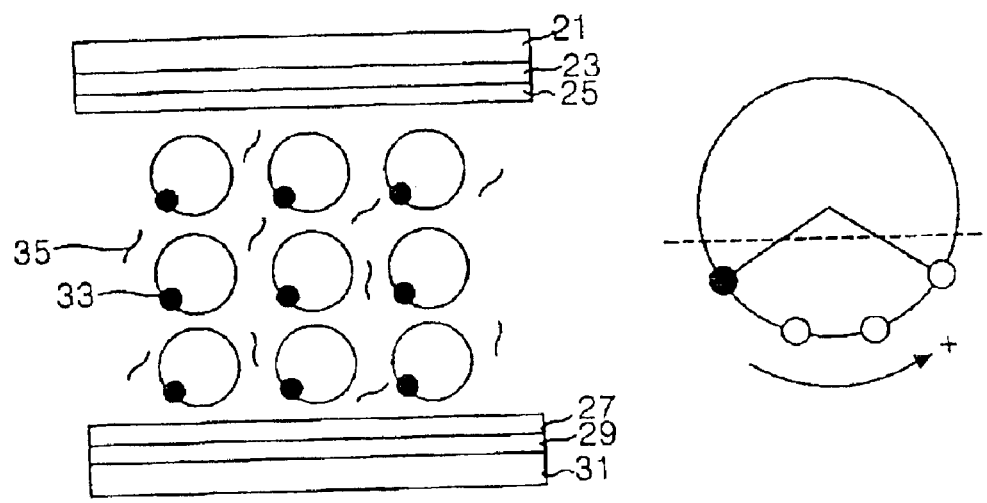
FIG. 9A to FIG. 9C illustrate an alignment process of an FLC liquid crystal cell according to an embodiment of the present invention.

FIGS. 9A to 9C and FIG. 10 illustrate fabricating an FLC liquid crystal cell according to an embodiment of the present invention. In FIG. 9A, the FLC mode liquid crystal cell includes an upper substrate 21 having a color filter layer (not shown), a common electrode 23, and an alignment film 25 that are sequentially disposed. That FLC liquid crystal cell also includes a lower substrate 31 having a thin film transistor (TFT) array 29 and an alignment 27. The thin film transistor (TFT) array 29 includes a plurality of pixel electrodes. After the upper substrate 21 and the lower substrate 31 are joined, a ferroelectric liquid crystal 33, which contains a small amount of a light-cured monomer 35, is injected between the upper substrate 21 and the lower substrate 31. Beneficially, the ferroelectric liquid crystal 33 is injected in the dark.

Figure 10:
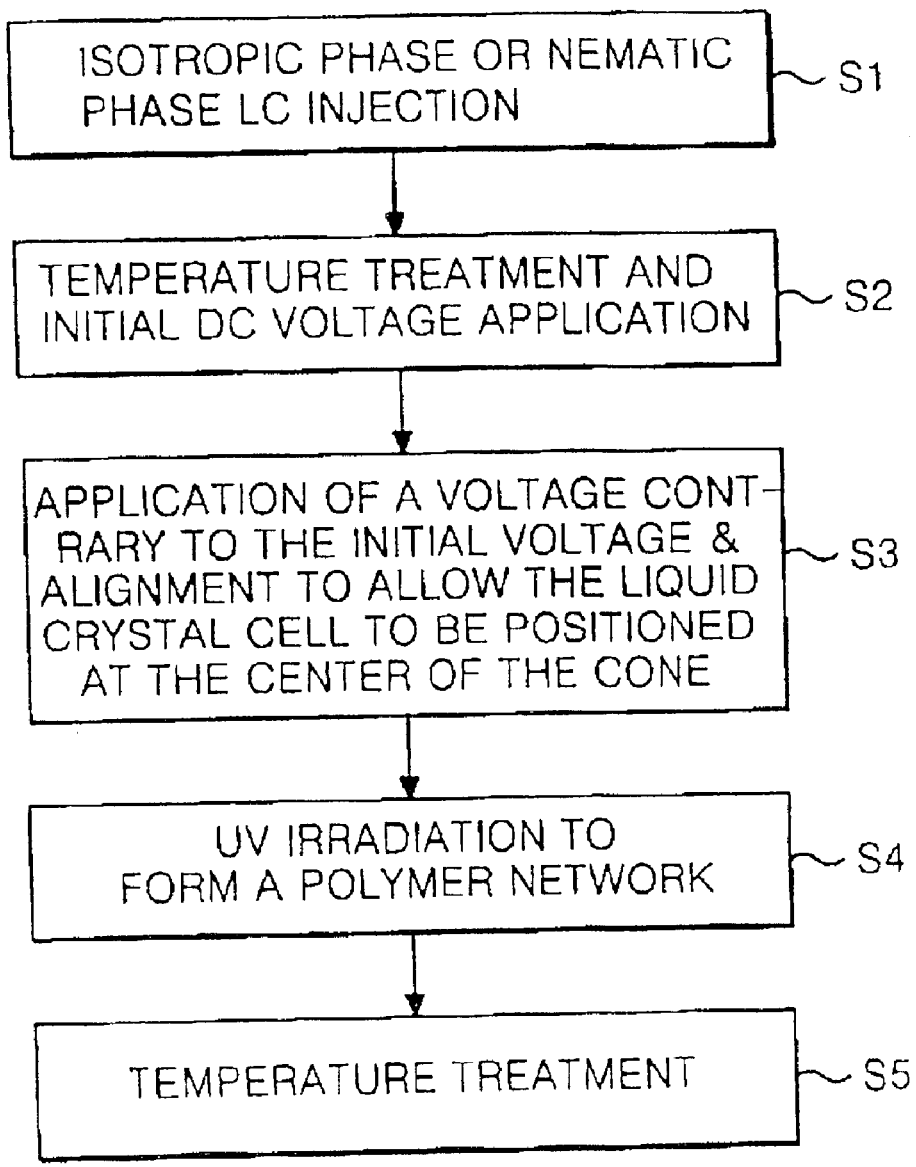
FIG. 10 is a flow chart of the alignment process illustrated in FIGS. 9A to 9C.

Referring now to FIG. 10, in a step S1 the ferroelectric liquid crystal 33 is maintained during injection at a temperature at which the liquid crystal has an isotropic phase or a nematic phase. Injection at such a temperature prevents damage to arranged liquid crystals, which could form due to the low injection rate of the liquid crystal, and due to shear stress to the alignment films. The low injection rate and the shear stress result from that the viscosity of a smectic phase liquid crystal being much larger than that of a nematic phase liquid crystal.

In step S2, a DC voltage is applied across the upper and lower substrates 21 and 31 while slowly lowering the temperature of the liquid crystal cell. This causes the liquid crystal 33 to uniformly align in the direction of a virtual cone, which indicates a rotatable path. Accordingly, the liquid crystal 33 is changed into a smectic phase and, at the same time, is initially aligned into a particular direction. This forms a mono-domain initial alignment.

Figure 9B:
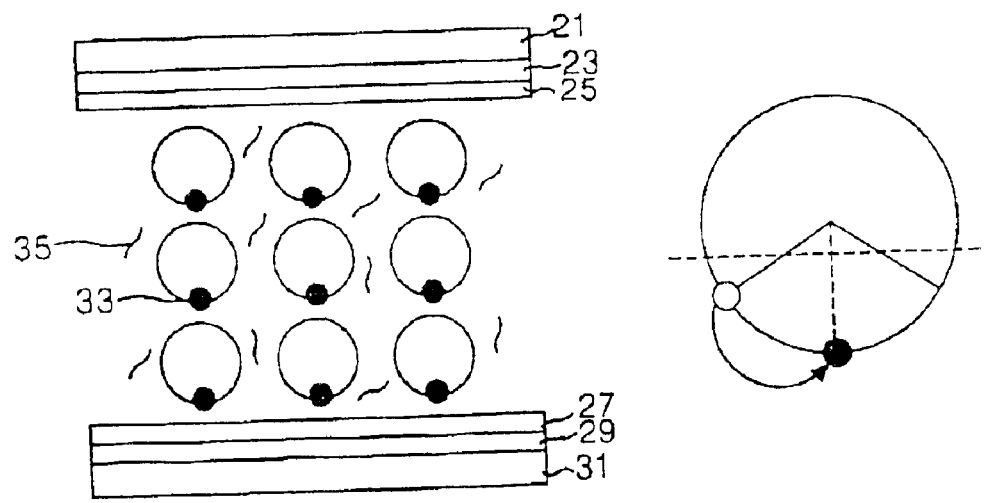

Referring now to FIG. 10 and to FIG. 9B, a DC voltage having a polarity contrary to the DC voltage that was used for the initial alignment is then applied, step S3. This arranges the liquid crystals 33 at the center of the cone, from which the liquid crystal 33 can be moved by applied potentials. This position is beneficially parallel to the alignment treatment direction. In this case, the DC voltage that positions the liquid crystal 33 at the center of the cone is dependent on the light-cured monomer 35 and on the spontaneous polarization of the liquid crystal 33.

Figure 9C:
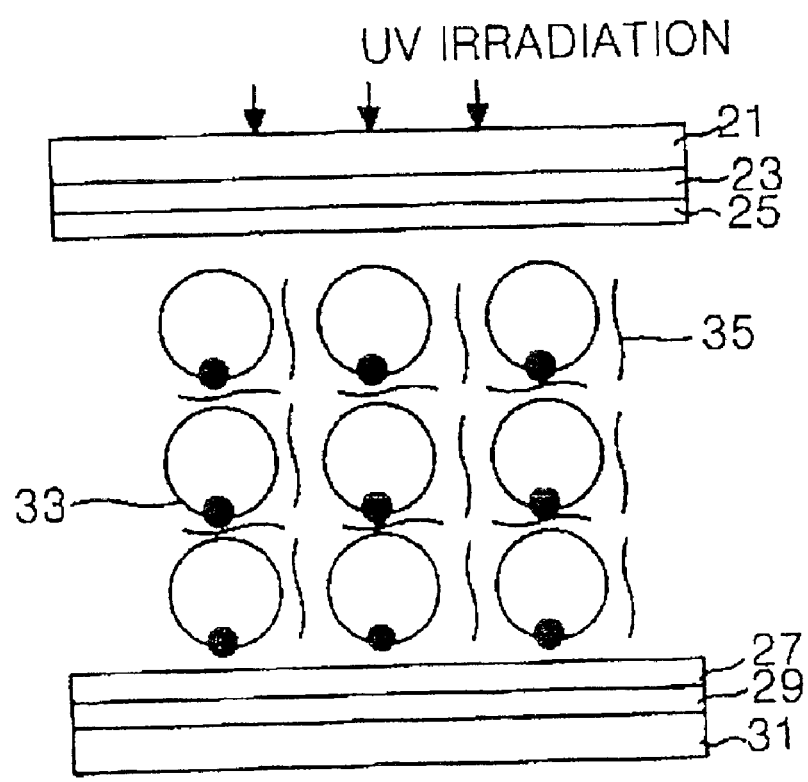

Referring now to FIG. 10 and to FIG. 9C, at step S4, the uniformly aligned liquid crystal from step S4 is exposed to ultraviolet light. This cures the light-cured monomer 35 into a network. Accordingly, the uniformly aligned liquid crystal 33 becomes stable. Beneficially, such a liquid crystal 33 can be driven by both positive and negative electric fields.

Referring now to FIG. 10, in step S5 the liquid crystal cell is heat treated by raising its temperature to a nematic phase. This stabilizes the liquid crystal alignment. The liquid crystal cell temperature is then slowly lowered to form a smectic phase. In this case, the liquid crystal 33 is stabilized by a polymer network structure to position liquid crystal molecules at the center of the virtual cone.

Figure 1:
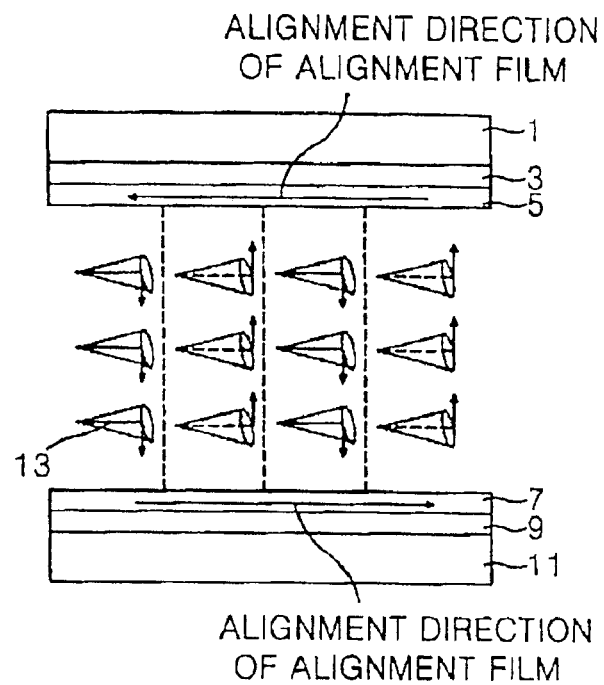
FIG. 1 illustrates an alignment state of a conventional V-mode FLC liquid crystal cell.
Figure 2:
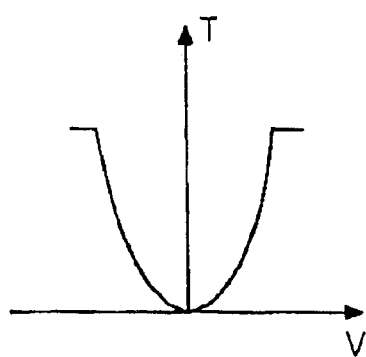
FIG. 2 is a graph representing light transmissivity verses voltage of the liquid crystal cell illustrated in FIG. 1.
Figure 3:
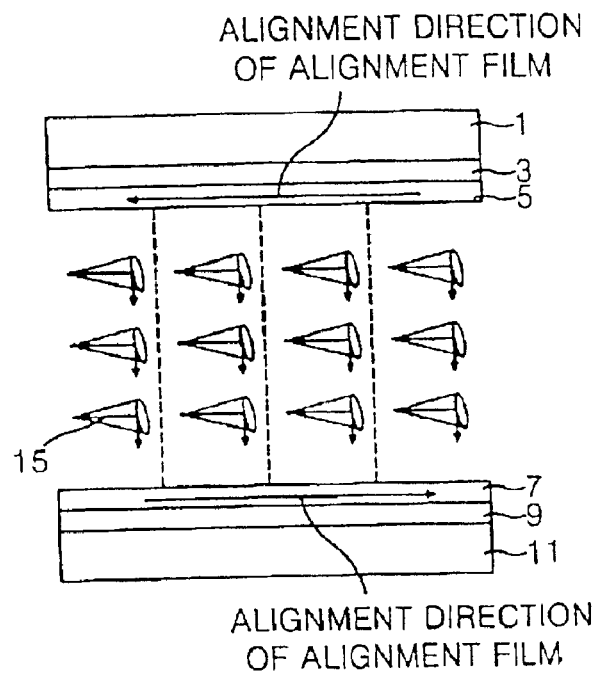
FIG. 3 illustrates an alignment state of a conventional half V-mode FLC liquid crystal cell.
Figure 4:
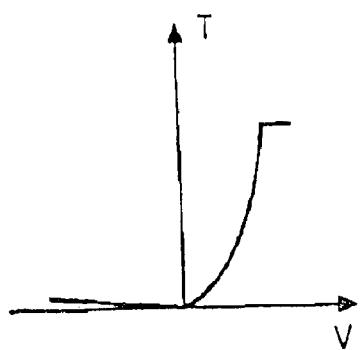
FIG. 4 is a graph representing light transmissivity verses voltage of the liquid crystal cell illustrated in FIG. 3.
Figure 5:
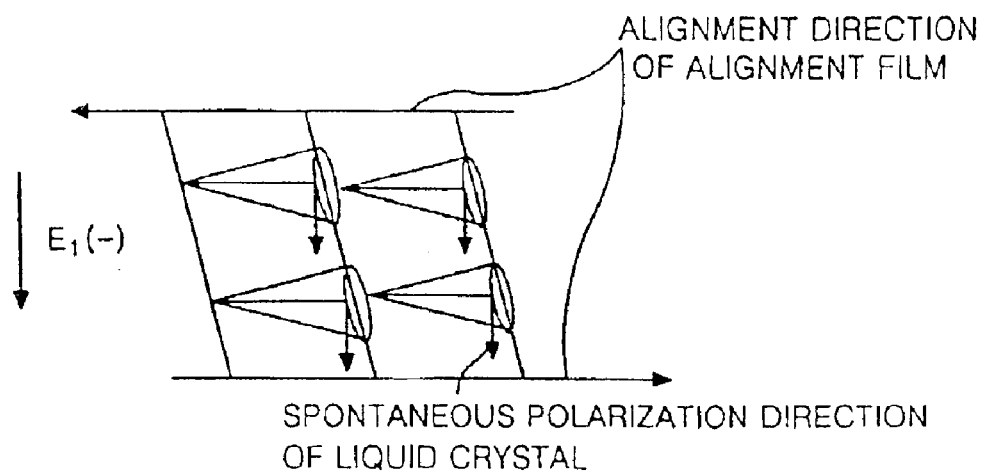
FIG. 5 illustrates applying an electric field to a half V-mode FLC liquid crystal cell.
Figure 6:
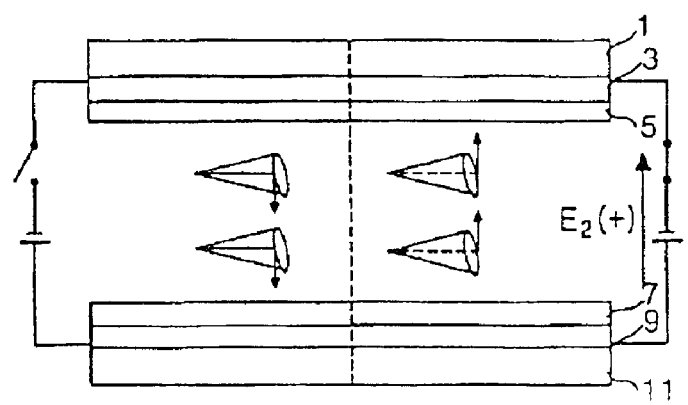
FIG. 6 depicts the motion of liquid crystal molecules in a half V-mode FLC liquid crystal cell.
Figure 7:
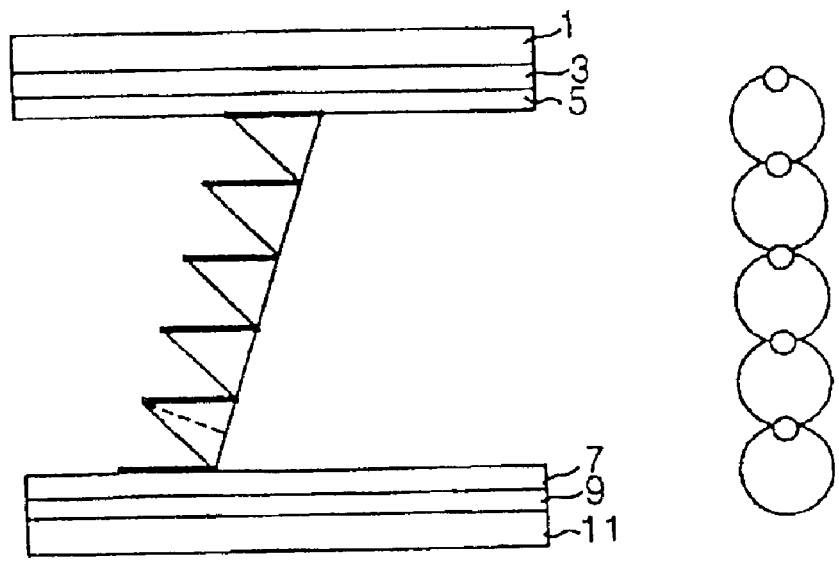
FIG. 7 illustrates an alignment state of a liquid crystal cell in an alternative mode liquid crystal cell.
Figure 7:
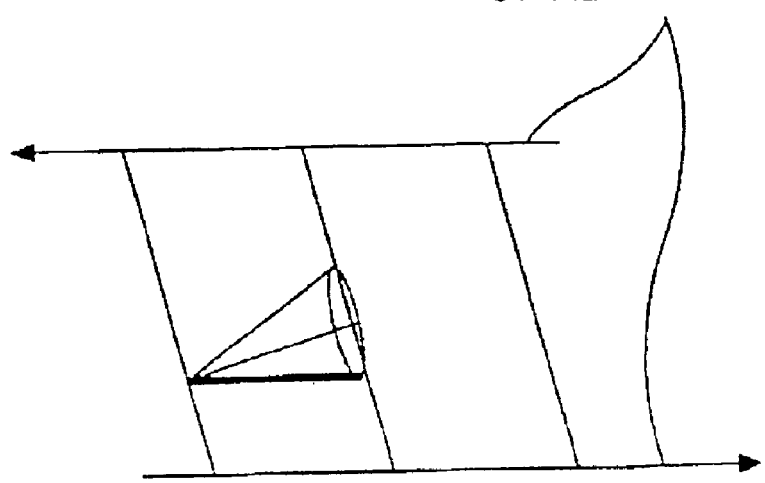
Figure 8:
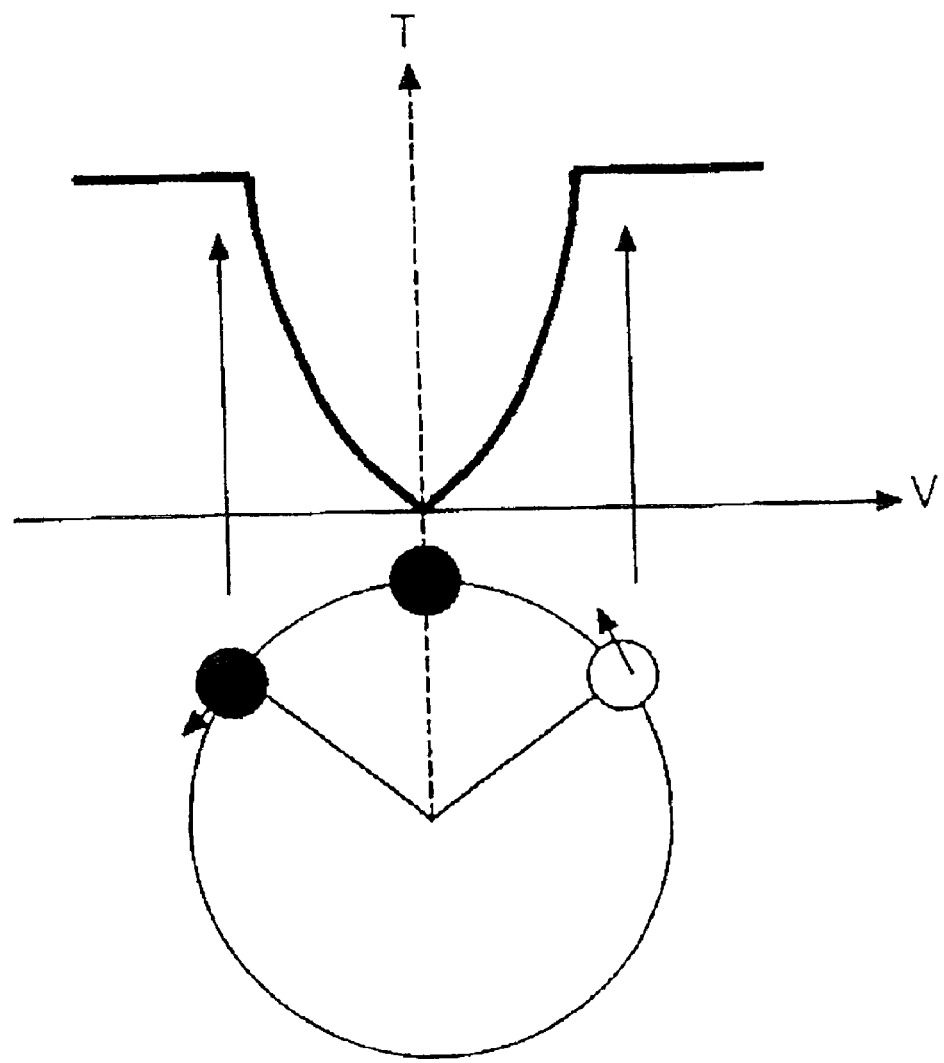
FIG. 8 is a graph representing light transmissivity verses voltage of the FLC liquid crystal cell illustrated in FIG. 7.

An FLC liquid crystal cell according to the principles of the present invention that has its liquid crystal alignment broken by an external impact can be re-aligned by a heat treatment. Also, the molecule arrangement and the driving characteristics of an FLC according to the present invention are similar to those of the FLC liquid crystal cell illustrated in FIG. 7. Furthermore, an FLC liquid crystal cell according to the principles of the present invention can be driven by positive and negative voltages such that flicker can be reduced. Moreover, an FLC liquid crystal cell according to the principles of the present invention can have an improved rotation angle and improved light transmissivity.

As described above, according to the present invention, the liquid crystal is positioned at the center of an FLC rotation cone and a polymer network is formed, thereby assuring alignment stability. Accordingly, it becomes possible to provide a stable liquid crystal alignment. By providing a liquid crystal centered in the cone it becomes possible to drive the liquid crystal cell with either polarity, which enables reduced flicker, thereby improving picture quality.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A ferroelectric liquid crystal display, comprising:
a upper substrate having a first alignment film;
a lower substrate having a second alignment film, wherein said lower substrate is attached to said upper substrate such that said first alignment film and said second alignment film face each other; and
a ferroelectric liquid crystal between said upper substrate and said lower substrate, wherein said ferroelectric liquid crystal includes a polymer network and is positioned at a center of a virtual cone formed by an initial alignment.

2. The ferroelectric liquid crystal display according to claim 1, wherein said first alignment film and said second alignment film have parallel alignment directions.

3. The ferroelectric liquid crystal display according to claim 1, wherein said ferroelectric liquid crystal is aligned in parallel with an alignment direction of said first alignment film.

4. The ferroelectric liquid crystal display according to claim 1, wherein said upper substrate includes a color filter layer.

5. The ferroelectric liquid crystal display according to claim 4, wherein said upper substrate includes a common electrode.

6. The ferroelectric liquid crystal display according to claim 1, wherein said lower substrate includes a pixel electrode.

7. The ferroelectric liquid crystal display according to claim 1, wherein said polymer network is formed from a light-curing monomer.

* * * * *